(12) United States Patent
Kidamura (10) Patent No.: US 9,727,398 B2
(45) Date of Patent: Aug. 8, 2017

(54) INFORMATION PROCESSING APPARATUS, CONTROL DEVICE, AND COMPUTER-READABLE RECORDING MEDIUM HAVING STORED CONTROL PROGRAM

(71) Applicant: FUJITSU LIMITED, Kawasaki-shi, Kanagawa (JP)

(72) Inventor: Takashi Kidamura, Kahoku (JP)

(73) Assignee: FUJITSU LIMITED, Kawasaki (JP)

( * ) Notice: Subject to any disclaimer, the term of this patent is extended or adjusted under 35 U.S.C. 154(b) by 87 days.

(21) Appl. No.: 14/523,987

(22) Filed: Oct. 27, 2014

(65) Prior Publication Data

US 2015/0143175 A1 May 21, 2015

(30) Foreign Application Priority Data

Nov. 19, 2013 (JP) ................. 2013-238926

(51) Int. Cl.
*G06F 11/07* (2006.01)

(52) U.S. Cl.
CPC ...... *G06F 11/0706* (2013.01); *G06F 11/0793* (2013.01)

(58) Field of Classification Search
USPC ...................................................... 714/5.11
See application file for complete search history.

(56) References Cited

U.S. PATENT DOCUMENTS

| | | | | |
|---|---|---|---|---|
| 2003/0188233 A1* | 10/2003 | Lubbers | ............. | G06F 11/2069 714/100 |
| 2008/0005614 A1* | 1/2008 | Lubbers | ............. | G06F 11/2092 714/11 |
| 2012/0246510 A1 | 9/2012 | Kojina | | |
| 2014/0006873 A1* | 1/2014 | Kidamura | ........... | G06F 11/0751 714/42 |
| 2014/0032965 A1* | 1/2014 | Tsukamoto | ......... | G06F 11/3024 714/30 |
| 2014/0289398 A1* | 9/2014 | Nakai | ..................... | H04L 41/06 709/224 |
| 2015/0089285 A1* | 3/2015 | Lim | .................... | G06F 11/1438 714/15 |

FOREIGN PATENT DOCUMENTS

| | | |
|---|---|---|
| JP | 10-187473 | 7/1998 |
| JP | 2008-59558 | 3/2008 |
| JP | 2012-198822 A | 10/2012 |

OTHER PUBLICATIONS

Japanese Office Action dated Jun. 6, 2017 for corresponding Japanese Patent Application No. 2013-238926, with Partial English Translation, 5 pages.

* cited by examiner

*Primary Examiner* — Kamini Patel
(74) *Attorney, Agent, or Firm* — Fujitsu Patent Center (57) ABSTRACT

A first control device includes: a switch device including a first port connected to a second control device among the plurality of control devices via a first channel and a second port connected to the second control device via a second channel and to which a processing device is connected; a detection unit that detects an error in the control devices; a first reset processing unit that performs a port reset of the first port included in the switch device; and a transmitting unit that transmits a reset instruction to the second control device; thereby propagation of an error occurred in a control device can be inhibited.

17 Claims, 5 Drawing Sheets

INFORMATION PROCESSING APPARATUS, CONTROL DEVICE, AND COMPUTER-READABLE RECORDING MEDIUM HAVING STORED CONTROL PROGRAM

CROSS-REFERENCE TO RELATED APPLICATION

This application is based upon and claims the benefit of priority of the prior Japanese Patent application No. 2013-238926, filed on Nov. 19, 2013, the entire contents of which are incorporated herein by reference.

FIELD

The embodiment discussed herein is directed to an information processing apparatus, a control device, and a computer-readable recording medium having stored a control program.

BACKGROUND

In a storage device such as a Redundant Arrays of Inexpensive Disks (RAID) device, generally Controller Modules (CMs) to control the device are redundantly mounted. In addition, these CMs are communicably connected via a general-purpose interface such as PCI Express (hereinafter, called PCIe) or a manufacturer specific interface to communicate with each other.

When one of CMs fail, the CM that has failed (failed CM) is isolated (degraded) and the operation of a RAID device is continued by using another normal CM. Thus, to prevent propagation of a failure from the CM that has failed to other normal CMs, it is desirable to instantly cut off connection between CMs when a failure is detected.

Figure 5:
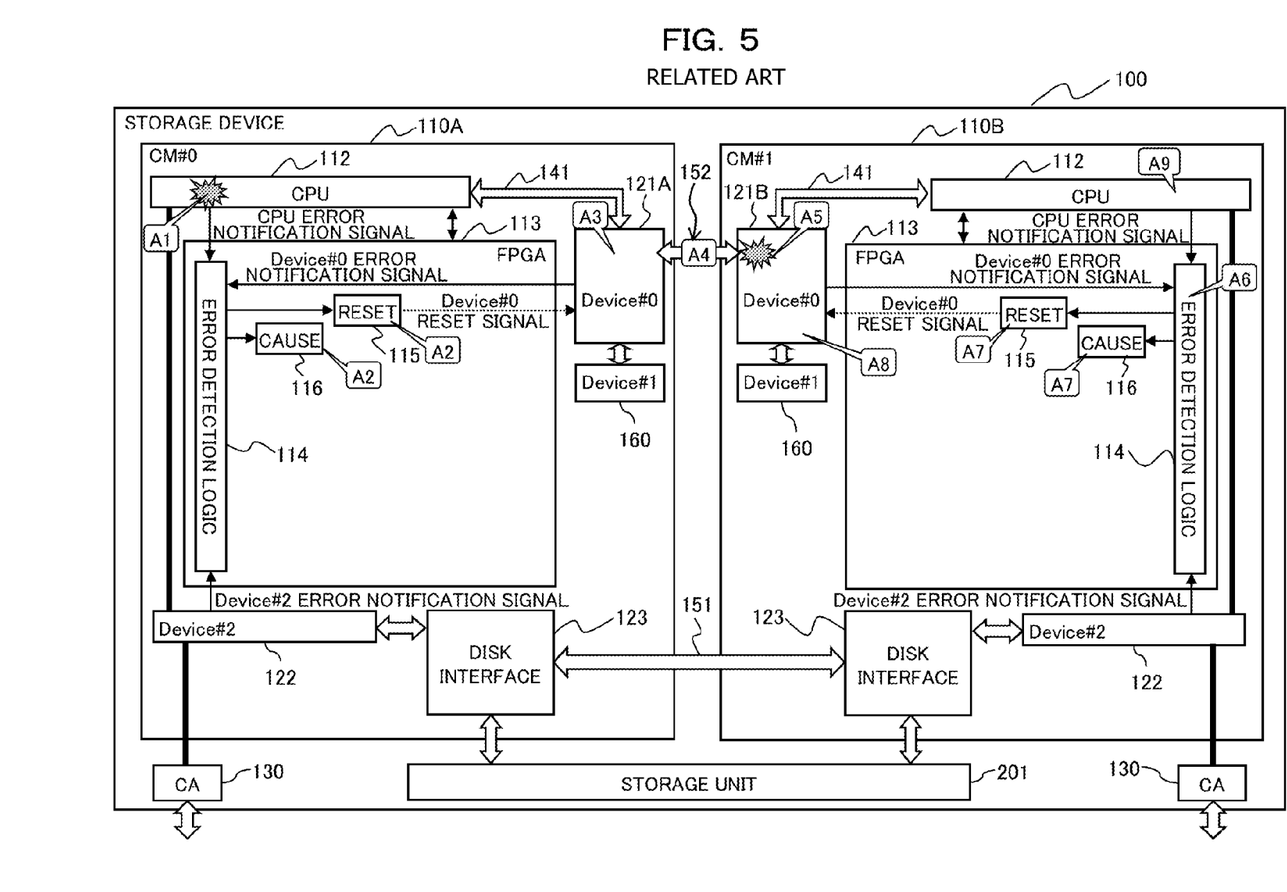
FIG. 5 is diagram showing the configuration of a conventional storage device.

FIG. 5 is a diagram showing the configuration of a conventional storage device 100.

The storage device 100 shown in FIG. 5 includes two CMs 110A, 110B and a storage unit 201.

The storage unit 201 includes one or more storages (not shown) and provides storage areas of these storages to a host device (not shown) connected via CA (Communication Adapter) 130, 130.

The CMs 110A, 110B are used to perform various kinds of control and perform various kinds of control such as access control to the storage unit 201 according to a storage access request (access control signal: hereinafter called a host I/O) from the host device. The CMs 110A, 110B have mutually almost the same configuration.

Hereinafter, when it is necessary to identify one of a plurality of CMs, the reference signs 110A, 110B are used as reference signs indicating CM, but a reference sign 110 is used when any CM is indicated.

The CM 110 includes, as shown in FIG. 5, a Central Processing Unit (CPU) 112, a Field-Programmable Gate Array (FPGA) 113, devices 121A, 121B (Device#0), a device 160 (Device#1), a device 122 (Device#2), and a disk interface 123.

The CPU 112 is a processing unit that performs various kinds of control or operation and realizes various functions such as RAID control by executing a program stored in a memory (not shown) or the like.

The disk interface 123 is, for example, an Serial Attached Small Computer System Interface (SAS) interface that is communicably connected to storages or the like in the storage unit 201. The disk interface 123 is also connected to a channel 151 and also functions as an interface unit that controls communication through the channel 151. The channel 151 communicably connects the disk interface 123 of the CM 110A and the disk interface 123 of the CM 110B.

The device 122 is a switch device that functions as a bridge connecting the CA 130, the CPU 112, and the disk interface 123 and is, for example, a PCIe switch.

The CPU 112, the host device, and the storage unit 201 are communicably connected via the device 122. That is, under the control of the CPU 112, a write operation or read operation of data is performed on the storage unit 201 in response to an I/O request from the host device via the device 122 and the disk interface 123. Accordingly, data can be written/read into/from the storage unit 201 from both of the CMs 110A, 110B.

The devices 121A, 121B are each connected to a channel 152 and are interface units that control communication by the channel 152. The device 121A is included in the CM 110A and the device 121B is included in the CM 110B. These devices 121A, 121B are, for example, PCIe switches and hereinafter, these devices 121A, 121B may be called PCIe switches 121A, 121B.

The PCIe switches 121A, 121B perform data communication conforming to the standard of PCIe between the CM 110A and the CM 110B via the channel 152.

These PCIe switches 121A, 121B has the same configuration. Hereinafter, when it is necessary to identify one of a plurality of PCIe switches, the reference signs 121A, 121B are used as reference signs indicating a PCIe switch, but a reference sign 121 is used when any PCIe switch is indicated.

The PCIe switches 121A, 121B also function as bridges connecting the CPU 112, the channel 152, and the device 160.

The channel 152 communicably connects the PCIe switch 121A of the CM 110A and the PCIe switch 121B of the CM 110B.

In each of the CMs 110A, 110B, the PCIe switches 121A, 121B and the CPU 112 are communicably connected by a channel 141 of PCIe respectively.

The device 160 is, for example, a Solid State Drive (SSD) and is used as a secondary cache of the CPU 112. In each of the CMs 110A, 110B, the device 160 is connected to the devices 121A, 121B and the CPU 112 accesses the device 160 via the devices 121A, 121B respectively.

The FPGA 113 is large-scale integration (LSI) that can be programmed and realizes a function to cut off connection between CMs when an error is detected in the CMs 110A, 110B.

The FPGA 113 includes, as shown in FIG. 5, error detection logic 114, an inter-FPGA communication controller 117, a reset register 115, and a cause register 116.

The cause register 116 is a register in which information identifying the cause of an error that has occurred is recorded and information indicating one of the devices 121, 122 and the CPU 112 is recorded.

The reset register 115 is a register that controls a reset state of Device#0. Device#0 is reset when "1" is recorded in the reset register 115. That is, when "1" is recorded in the reset register 115, "1" is input to a reset terminal provided in the device 121 as a reset instruction and the device 121 is put into a reset state. Accordingly, the interface between CMs is disconnected. When "0" is recorded in the reset register 115, the reset state of Device#0 is canceled.

The error detection logic 114 monitors for an error notification signal from the devices 121, 122 and the CPU 112. When an error is detected in the device 121, the error detection logic 114 is notified of a Device#0 error notification signal and when an error is detected in the device 122, the error detection logic 114 is notified of a Device#2 error notification signal. When an error is detected in the CPU 112, the error detection logic 114 is notified of a CPU error notification signal.

When the error detection logic 114 is notified of an error from one of the devices 121, 122 and the CPU 112, the error detection logic 114 sets "1" to the reset register 115 and also records information to identify the transmission source of the error notification in the cause register 116.

A technique to cut off connection between CMs when an error is detected in the CM 110 of the conventional storage device 100 will be described.

When, for example, an error occurs in the CPU 112 of the CM 110A in the example shown in FIG. 5 (see reference sign A1), the CPU 112 transmits a CPU error notification signal to the error detection logic 114.

The error detection logic 114 records "1" in the reset register 115 and also records in the cause register 116 that the CPU 112 is the error cause (see reference sign A2). With "1" being recorded in the reset register 115, the device 121A is reset (see reference sign A3) and CM communication between the CM 110A and the CM 110B is cut off (see reference sign A4).

With the communication between CMs being cut off as described above, the cutoff of communication between CMs is detected by the device 121B of the CM 110B as an error (see reference sign A5). The device 121B transmits a Device#0 error notification signal to the error detection logic 114 of the FPGA 113 of the CM 110B (see reference sign A6). Also in this CM 110B, the error detection logic 114 records "1" in the reset register 115 and also records in the cause register 116 that the CPU 112 is the error cause (see reference sign A7).

Also in this CM 110B, with "1" being recorded in the reset register 115, the device 121B is reset (see reference sign A8). That is, in the CM 110B in which no error has occurred, the device 121B is reset based on an error detected by the communication between CMs being cut off.

Patent Literature 1: Japanese Laid-open Patent Publication No. 10-187473

Patent Literature 2: Japanese Laid-open Patent Publication No. 2008-59558

In the conventional storage device 100 as described above, however, the device 121B is reset also in the CM 110B and so the CPU 112 can no longer use the device 160 connected under the device 121B (see reference sign A9). That is, a problem that an error that has occurred in the CM 110A makes the device 121B in the normal CM 110B unusable arises.

SUMMARY

Therefore, the information processing apparatus is an information processing apparatus including a plurality of control devices made to be redundant, wherein a first control device among the plurality of control devices includes a switch device including a first port connected to a second control device among the plurality of control devices via a first channel and a second port connected to the second control device via a second channel and to which a processing device is connected, a detection unit that detects an error in the control devices, a first reset processing unit that performs a port reset of the first port included in the switch device, and a transmitting unit that transmits a reset instruction to the second control device.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENT(S)

Hereinafter, an embodiment of the present information processing apparatus, control device, and control program will be described with reference to the drawings. However, the embodiment shown below is only illustrative and does not intend to exclude application of various modifications and technology that are not explicitly demonstrated in the embodiment. That is, various modifications (such as combining the embodiment and each modification) can be made without deviating from the spirit thereof. In addition, each figure is not intended to include only elements shown in the figure and can include other functions and the like.

Figure 1:
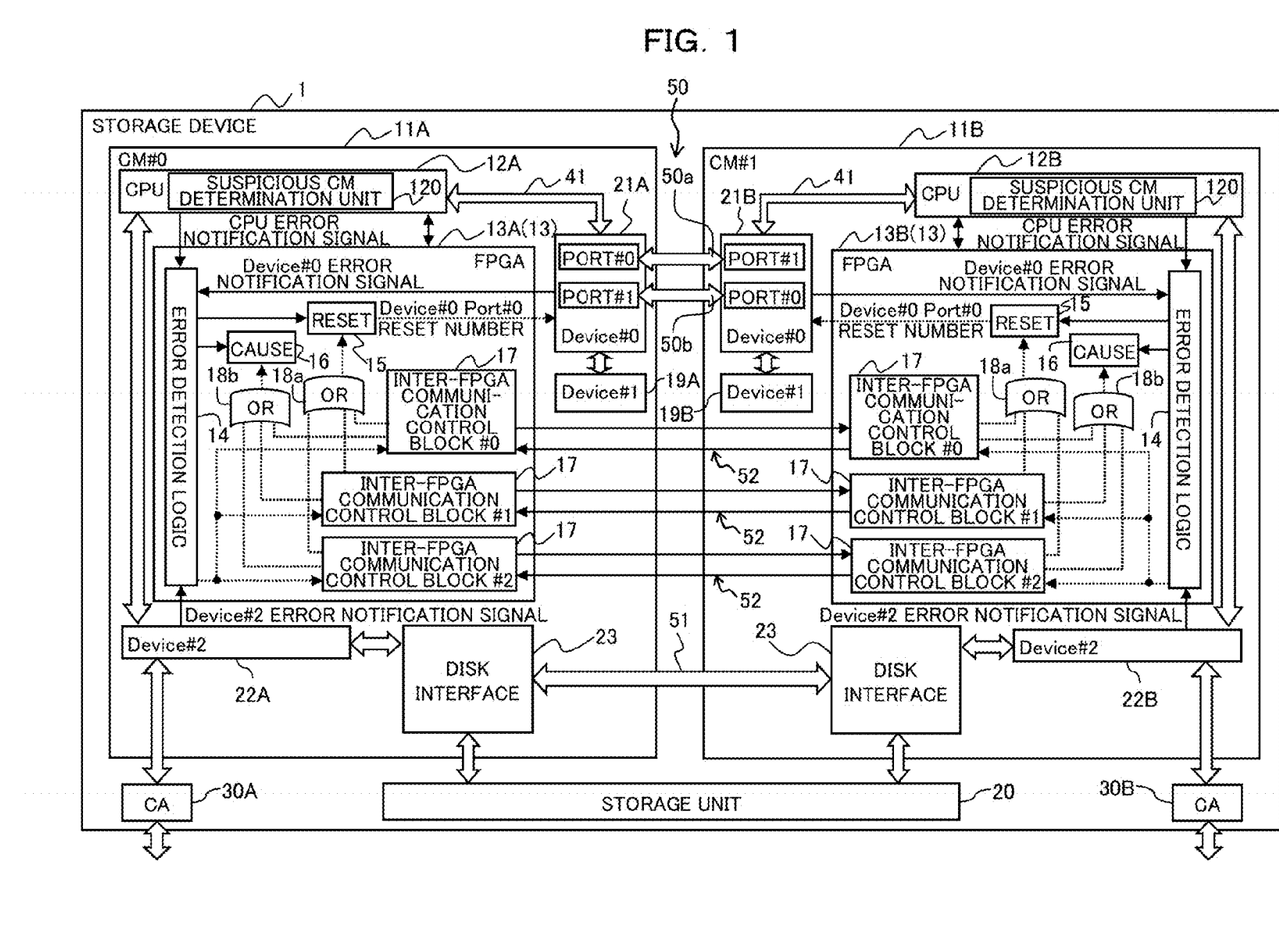
FIG. 1 is a block diagram showing a hardware configuration and a functional configuration of a storage device including a storage control device as an exemplary embodiment.

FIG. 1 is a block diagram showing a hardware configuration and a functional configuration of a storage device 1 as an exemplary embodiment.

The storage device 1 shown in FIG. 1 forms a virtual storage environment by virtualizing one or more storages (physical disks; not shown) mounted in a storage unit 20. Then, the storage device 1 provides a virtual volume to the host device (not shown) as an upper device.

The storage device 1 is communicably connected to one or more host devices (not shown). In the example shown in FIG. 1, a host device is connected to each of a pair of CAs 30A, 30B in the storage device 1.

The host device is, for example, an information processing apparatus with a server function and transmits/receives commands of Network Attached Storage (NAS) or Storage Area Network (SAN) to/from the storage device 1. The host device writes/reads data to/from a volume provided by the storage device 1 by transmitting a disk access command such as read/write to the storage device 1.

The storage device 1 responds to an input/output request (for example, a read command or write command) made from the host device to a volume and performs processing of reading or writing data on real storage corresponding to the volume. The input/output request from the host device may be called an I/O request, an I/O command, or a host I/O.

The storage device 1 includes one or more (two in the example shown in FIG. 1) CAs 11A, 11B and the storage unit 20.

The storage unit 20 includes one or more storages (not shown) and provides storage areas of these storages to the host device connected via the CAs 30A, 30B. Incidentally, RAID can be configured by using a plurality of storages.

CMs 11A, 11B are control devices (storage control devices) that perform various kinds of control and perform various kinds of control such as access control to the storage unit 20 according to a host I/O from the host device. Hereinafter, when it is necessary to identify one of a plurality of CMs, the reference signs 11A, 11B are used as reference signs indicating CM, but a reference sign 11 is used when any CM is indicated.

The CMs 11A, 11B have mutually almost the same configuration and are made redundant. That is, the CMs 11A, 11B are a dual system and normally, for example, the CM 11A performs various kinds of control as a primary CM (master). However, as the primary CM 11A fails, the CM 11B as the secondary CM (slave) takes over the operation of the CM 11A as the primary CM.

Hereinafter, the operation when the CM11A (CM#0) is the primary CM will be described, but when the CM11B (CM#1) is the primary CM, it is needless to say that the operation is the same as when the CM 11A is the primary CM. Thus, a detailed description when the CM 11B is the primary CM is omitted.

The CM 11A includes, as shown in FIG. 1, a CPU 12A, an FPGA 13A, a device 21A (Device#0), a device 19A (Device#1), a device 22A (Device#2), and a disk interface 23. The CM 11B includes, as shown in FIG. 1, a CPU 12B, an FPGA 13B, a device 21B (Device#0), a device 19B (Device#1), a device 22B (Device#2), and the disk interface 23.

Hereinafter, when it is necessary to identify one of a plurality of CPUs, the reference signs 12A, 12B are used as reference signs indicating CPU, but a reference sign 12 is used when any CPU is indicated. Similarly, hereinafter, when it is necessary to identify one of a plurality of FPGAs, the reference signs 13A, 13B are used as reference signs indicating FPGA, but a reference sign 13 is used when any FPGA is indicated. Also, hereinafter, when it is necessary to identify one of a plurality of devices, the reference signs 21A, 22A, 19A, 21B, 22B, 19B are used as reference signs indicating a device, but reference signs 21, 22, 19 are used when any device is indicated.

The CPU 12 is a processing unit that performs various kinds of control or operation and realizes various functions such as RAID control by executing a program stored in a memory (not shown) or the like. The CPU 12 also realizes a function to identify the suspicious CM 11 to be repaired from among a plurality of the CMs 11 when an error is detected in the CM 11 included in the storage device 1 by executing a suspicious CM determination program (firmware).

Figure 4:
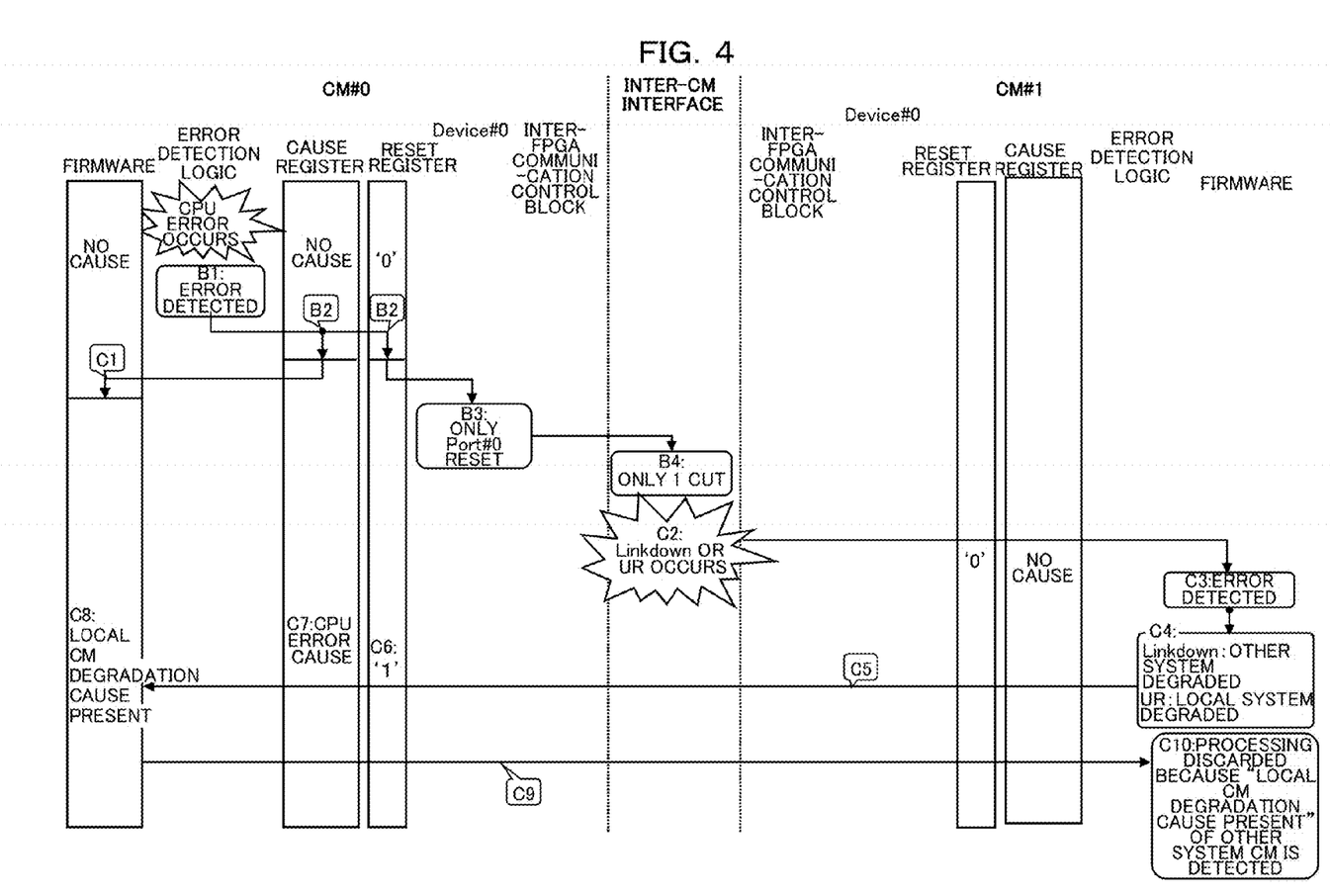
FIG. 4 is a sequence diagram showing determination method of a suspicious CM in the storage device as an exemplary embodiment.

Details of the function to identify the suspicious CM 11 will be described later using FIG. 4.

The disk interface 23 is, for example, an SAS interface and is communicably connected to storages or the like in the storage unit 20. The disk interface 23 is also connected to a channel 51 and functions as an interface unit that controls communication via the channel 51. The channel 51 connects the disk interface 23 of the CM 11A and the disk interface 23 of the CM 11B.

The device 19 is, for example, SSD and is used as a secondary cache of the CPU 12. In each of the CMs 11, the device 19 is connected to the device 21.

The device 22 is a switch device functioning as a bridge connecting the CA 30, the CPU 12, and the disk interface 23 and is, for example, a PCIe switch.

The CPU 12, the host device, and the storage unit 20 are communicably connected via the device 22. That is, under the control of the CPU 12, a write operation or read operation of data is performed on the storage unit 20 in response to an I/O request from the host device via the device 22 and the disk interface 23. Accordingly, data can be written/read into/from the storage unit 20 from both of the CMs 11A, 11B.

The devices 21A, 21B are connected to channels 50, 41 and are interfaces units to control communication by these channels 50, 41 and, for example, PCIe switches. The device 21A is included in the CM 11A and the device 21B is included in the CM 11B. Hereinafter, these devices 21A, 21B may be called the PCIe switches 21A, 21B. These PCIe switches 21A, 21B have configurations similar to each other. Hereinafter, when it is necessary to identify one of a plurality of PCIe switches, the reference signs 21A, 21B are used as reference signs indicating a PCIe switch, but a reference sign 21 is used when any PCIe switch is indicated.

The channel (inter-PCIeSW channel; first channel) 50 includes a channel (first channel) 50a and a channel (second channel) 50b and communicably connects the PCIe switch 21A of the CM 11A and the PCIe switch 21B of the CM 11B.

The PCIe switches 21A, 21B each include a Port#0 (PORT#0) and a Port#1 (PORT#1). Then, the Port#0 (first port) of the PCIe switch 21A is connected to the Port#1 of the PCIe switch 21B via the channel 50a. Also, the Port#1 (second port) of the PCIe switch 21A is connected to the Port#0 (third port) of the PCIe switch 21B via the channel 50b.

In each of the CMs 11, the PCIe switch 21 functions as a bridge connecting the CPU 12 and the device 19.

The PCIe switch 21 includes a port (not show) and the device 19 is connected to the port. Also in each of the CMs 11, the PCIe switch 21 and the CPU 12 are communicably connected by a channel (CPU-PCIeSW channel) 41 of the respective PCIe. Accordingly, the CPU 12 is communicably connected to the device 19 via the channel 41 and the PCIe switch 21.

The PCIe switch 21 also includes a Port#0 reset signal input terminal (not shown) and when, for example, "1 (Device#0 Port#0 reset signal)" is input into the Port#0 reset signal input terminal as a reset instruction, only the Port#0 is put into the reset state. That is, the PCIe switch 21 is configured so that a port unit reset signal (Device#0 Port#0 reset signal) capable of resetting the PCIe switch 21 in units of ports can be input.

Hereinafter, inputting a Device#0 Port#0 reset signal into the Port#0 reset signal input terminal of the PCIe switch 21 may be expressed simply as inputting a Device#0 Port#0 reset signal into the PCIe switch 21. Also hereinafter, only the Port#0 being put into the reset state in the PCIe switch 21 may be expressed as a port reset state.

When, for example, a Device#0 Port#0 reset signal is input into the PCIe switch 21A, the Port#0 is reset and communication by the channel 50a connected to the Port#0 is broken off. At this point, in the PCIe switch 21, communication ports to which the Port#1 or the device 19 is not broken off.

When "0" is recorded in a Port#0 reset signal input terminal, the reset of the Port#0 is canceled.

Similarly, when a Device#0 Port#0 reset signal is input into the PCIe switch 21B, the Port#0 is reset and communication by the channel 50b connected to the Port#0 is broken off.

Then, with each Port#0 reset after a Device#0 Port#0 reset signal being input into both of the PCIe switch 21A and the PCIe switch 21B, the channel 50a and the channel 50b are cut off and thereby, the channel 50 is cut off.

Hereinafter, the PCIe switches 21A, 21B and the channel 50 in the storage device 1 may be called an inter-CM interface.

In the PCIe switch 21, however, when a Device#0 Port#0 reset signal is input, in contrast to a state in which the whole PCIe switch 21 is reset, only the Port#0 is reset. Thus, the port (not shown) to which the Device#1 is connected continues a normal operation. That is, even if the Port#0 is cut off, the Device#1 can be used uninterruptedly.

The FPGA 13 is large-scale integration (LSI) that can be programmed and realizes a function to cut off connection between CMs when an error is detected in the CMs 11A, 11B.

The FPGA 13 includes, as shown in FIG. 1, error detection logic 14, a reset register 15, a cause register 16, OR circuits 18a, 18b, and a plurality (three in the example shown in FIG. 1) of inter-FPGA communication control blocks 17.

The reset register 15 is a register that controls the port reset state of the PCIe switch 21 and when "1" is recorded in the reset register 15, the Port#0 of the PCIe switch 21 is reset. That is, when "1" is recorded in the reset register 15, a Device#0 Port#0 reset signal ("1") is input into the Port#0 reset signal input terminal of the PCIe switch 21 as a reset signal. Accordingly, the PCIe switch 21 is put into the port reset state.

Therefore, the reset register 15 functions as a reset processing unit that performs a port reset of the Port#0 included in the PCIe switch 21A mounted on the same CM 11.

When "0" is recorded in the reset register 15, the port reset of the PCIe switch 21 is canceled.

In the reset register 15, "1" or "0" is recorded by the error detection logic 14 described later and further, "1" or "0" is recorded by the OR circuit 18a described later.

The cause register 16 is a register in which information identifying the cause of an error that has occurred is recorded and as an error cause, identification information indicating one of the devices 21, 22 or the CPU 12 or information indicating reception of a Device#0 Port#0 reset request notification from the CM 11 in another system is recorded.

For example, the cause register 16 includes a plurality of storage areas (areas) corresponding to each error cause candidate of each of the devices 21, 22 and the CPU 12 and also an area corresponding to a Device#0 Port#0 reset request notification from the CM 11 in another system. In these areas, for example, a flag (identification information: for example "1") is stored.

Then, the error detection logic 14 described later sets the flag "1" to, among areas provided in the cause register 16 corresponding to the devices 21, 22 and the CPU 12, an area corresponding to an error notification source.

In addition, the OR circuit 18b described later sets a flag (for example, "1") to an area corresponding to a Device#0 Port#0 reset request notification from the CM 11 in another system.

Accordingly, the flag "1" recorded in one of areas of the cause register 16 functions as identification information indicating one of the devices 21, 22 and the CPU 12 as an error cause or identification information indicating reception of a Device#0 Port#0 reset request notification from the CM 11 in another system. That is, by checking an area of the cause register 16 in which "1" is recorded in a port reset state of the PCIe switch 21, the cause (error cause) of the port reset state can be identified. Hereinafter, information recorded in each area of the cause register 16 will be called error cause information.

By checking the error cause information in a port reset state of the PCIe switch 21, the cause of the port reset state can be identified. That is, whether the PCIe switch 21 has been put into the port reset state because of an error that has occurred in one of the devices 21, 22 and the CPU 12 or whether the PCIe switch 21 has been put into the port reset state because of reception of a Device#0 Port#0 reset request notification from the CM 11 in another system can be identified.

The error detection logic 14 monitors for an error notification signal from the devices 21, 22 or the CPU 12 in the same CM 11. When an error is detected in, for example, the PCIe switch 21, the error detection logic 14 is notified of a Device#0 error notification signal and when an error is detected in the device 22, the error detection logic 14 is notified of a Device#2 error notification signal. When an error is detected in the CPU 12, the error detection logic 14 is notified of a CPU error notification signal. Therefore, the error detection logic 14 functions as a detection unit that detects an error in the CM 11A.

When an error is notified from one of the devices 21, 22 and the CPU 12, the error detection logic 14 sets "1" to the reset register 15.

Further, when an error is notified from one of the devices 21, 22 and the CPU 12, the error detection logic 14 sets "1" to an area of the cause register 16 corresponding to the transmission source of the error notification. That is, the error detection logic 14 records information identifying the transmission source of an error notification in the cause register 16 as an error cause.

When error cause information is recorded in the cause register 16, that is, when "1" is set to one of areas of the cause register 16, the error detection logic 14 does not update the recorded error cause information.

That is, after receiving an error notification from one of the devices 21, 22 and the CPU 12, the error detection logic 14 does not update the cause register 16 even if an error notification is received from another device.

Thus, the error cause of the first error notification is recorded in the cause register 16. Accordingly, by referring to the cause register 16, the first error cause in the storage device 1 can be identified.

When an error is notified from one of the devices 21, 22 and the CPU 12, the error detection logic 14 transmits an error detection notification to each of the inter-FPGA communication control blocks 17.

The inter-FPGA communication control block 17 performs data communication between the CM 11A and the CM 11B. The FPGA 13A of the CM 11A includes the one or more (three of #0 to #2 in the example shown in FIG. 1) inter-FPGA communication control blocks 17 and the FPGA 13B of the CM 11B also includes the same number (three of #0 to #2 in the example shown in FIG. 1) of the inter-FPGA communication control blocks 17.

Each of the inter-FPGA communication control blocks 17 in the CM 11A is communicably connected to the inter-FPGA communication control block 17 in the CM 11B in a one-to-one correspondence via a respective channel (third channel) 52. Incidentally, the channel 52 desirably performs communication of a different protocol from the protocol of communication of the channel 50.

When an error detection notification is received from the error detection logic 14 in the same CM 11 (the same FPGA 13), the inter-FPGA communication control block 17 transmits a Device#0 Port#0 reset request signal to the inter-FPGA communication control blocks 17 of the other CM 11 via the channel 52.

When a Device#0 Port#0 reset request signal is received from the inter-FPGA communication control blocks 17 of the other CM 11 via the channel 52, each of the inter-FPGA communication control blocks 17 inputs "1" into each of the OR circuit 18a and the OR circuit 18b.

An output signal (reset instruction signal) from each of the inter-FPGA communication control blocks 17 provided in the same FPGA 13 is input into the OR circuit 18a and these input signals are ORed and the result thereof is set to the reset register 15. That is, if "1" is input from one of the inter-FPGA communication control blocks 17 provided in the same FPGA 13, the OR circuit 18a sets "1" to the reset register 15. Accordingly, a reset of the Port#0 of the PCIe switch 21 in the same CM 11 is caused.

An output signal (reset instruction signal) from each of the inter-FPGA communication control blocks 17 provided in the same FPGA 13 is input into the OR circuit 18b and these input signals are ORed and the result thereof is set to the cause register 16. That is, if "1" is input from one of the inter-FPGA communication control blocks 17 provided in the same FPGA 13, the OR circuit 18b sets "1" to a storage area of the cause register 16 corresponding to a Device#0 Port#0 reset request notification from the CM 11 of the another system as error cause information.

The cause register 16 includes a function to prevent an update when error cause information is already stored. Thus, when recording of error cause information is attempted, an update of the cause register 16 is prevented if other error cause information is already recorded in the cause register 16.

Processing when an error occurs in the storage device 1 as an exemplary embodiment configured as described above will be described with reference to FIGS. 2 and 3.

Figure 2:
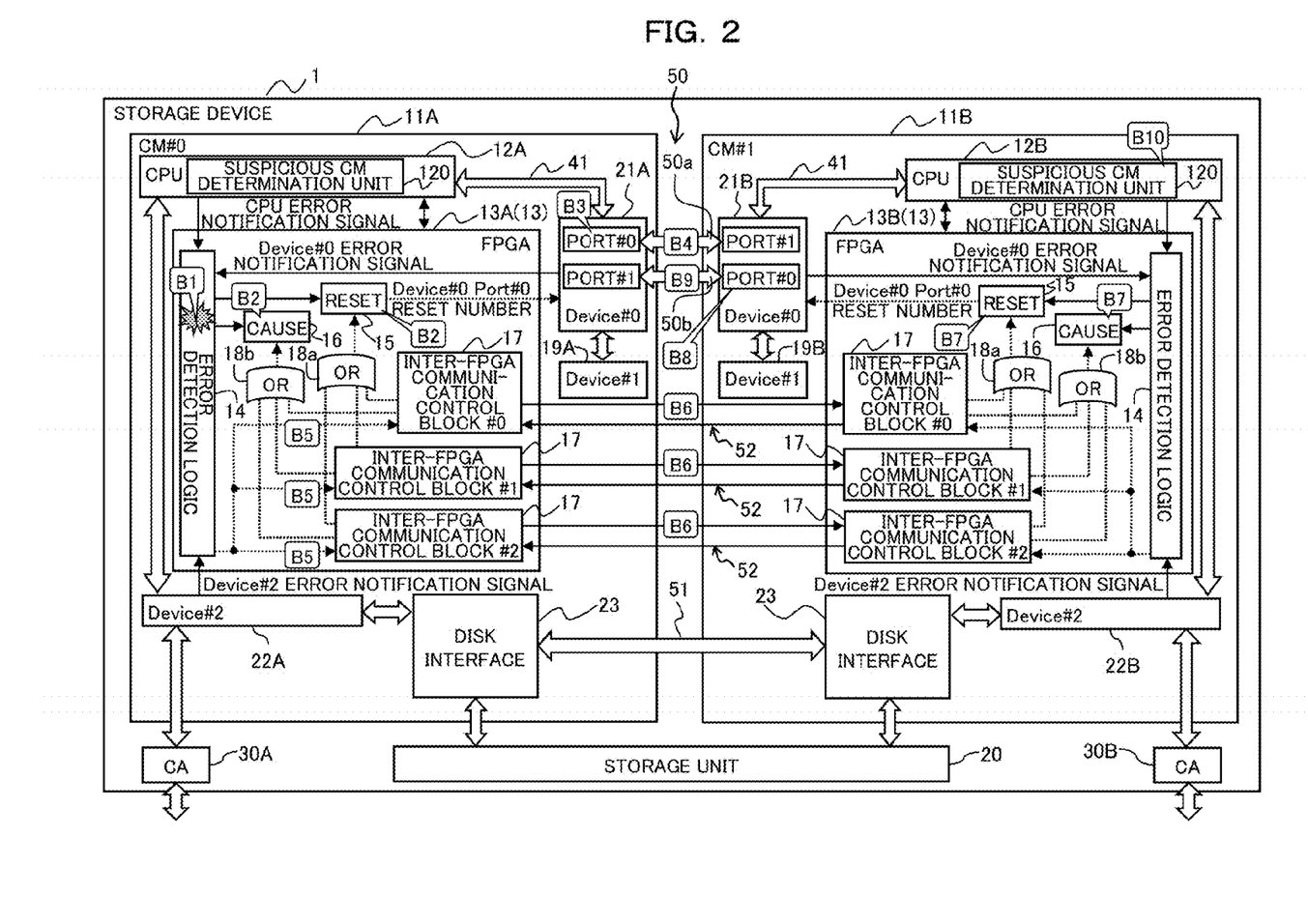
FIG. 2 is a diagram showing the flow of data when an error occurs in the storage device as an exemplary embodiment.
Figure 3:
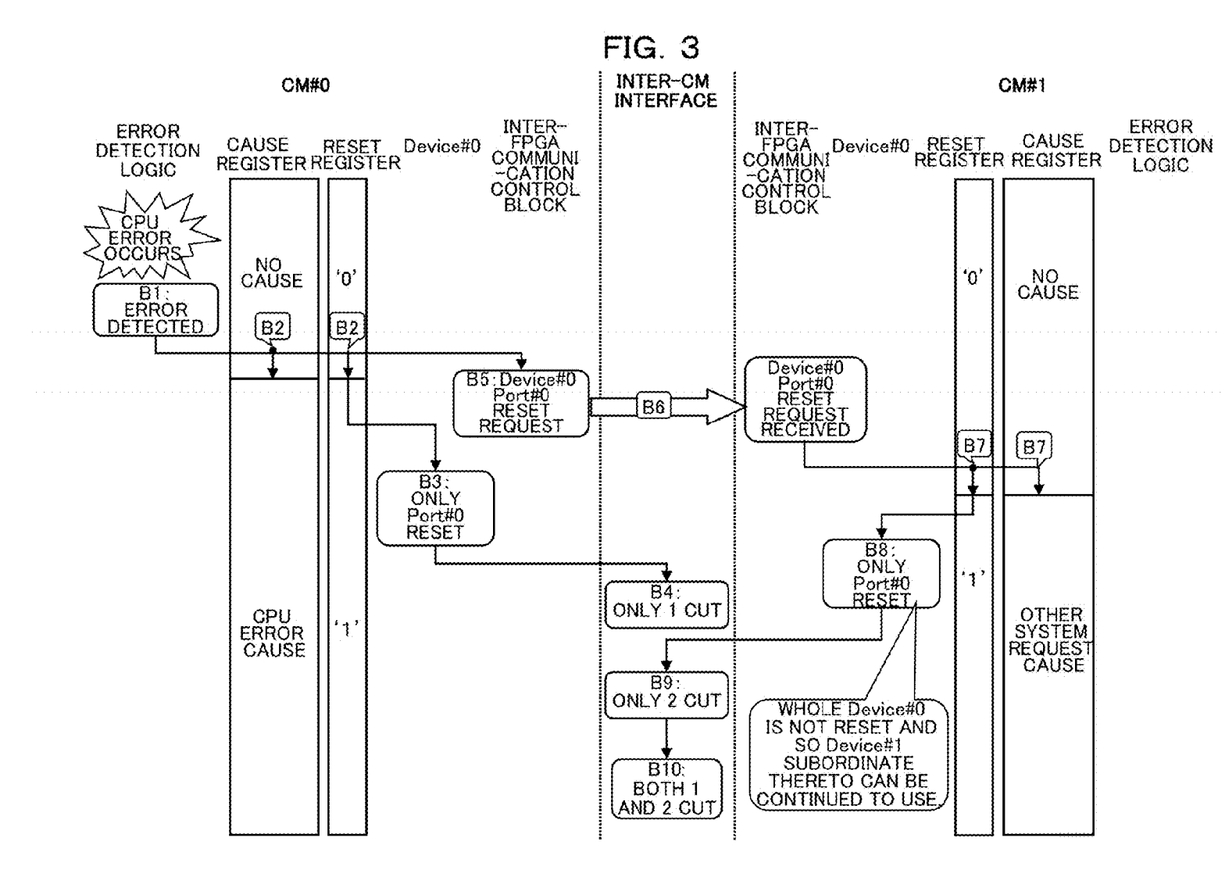
FIG. 3 is a sequence diagram showing processing when the error occurs in the storage device as an exemplary embodiment.

FIG. 2 is a diagram showing the flow of data when an error occurs in the storage device 1 as an exemplary embodiment and FIG. 3 is a sequence diagram showing processing when the error occurs. Reference signs B1 to B10 in FIGS. 2 and 3 show corresponding processing.

Hereinafter, an example in which an error occurs in the CPU 12A of the CM 11A will be shown.

In the initial state, information indicating an error cause is not recorded in each area of the cause register 16 (no cause) and "0" is recorded in the reset register 15.

For example, when an error occurs in the CPU 12A of the CM 11A, the CPU 12A transmits a CPU error notification signal to the error detection logic 14 of the FPGA 13A provided in the same CM 11A. The error detection logic 14 detects occurrence of an error by receiving the error notification signal (see reference sign B1).

When an error is detected, the error detection logic 14 sets "1" to the reset register 15 and also sets "1" to an area of the cause register 16 corresponding to the CPU 12 as a transmission source of the error notification (see reference sign B2).

When "1" is recorded in the reset register 15, a Device#0 Port#0 reset signal ("1") is input into the Port#0 reset signal input terminal of the PCIe switch 21A as a reset instruction and the Port#0 (first port) of the PCIe switch 21A is put into the port reset state (see reference sign B3). Accordingly, communication by the channel 50a connected to the Port#0 is broken off (see reference sign B4).

The error detection logic 14 also transmits an error detection notification to each of the inter-FPGA communication control blocks 17 (see reference sign B5).

When an error detection notification is received from the error detection logic 14 in the same CM 11A (the same FPGA 13A), each of the inter-FPGA communication control blocks 17 transmits a Device#0 Port#0 reset request signal to the inter-FPGA communication control block 17 of the CM 11B (see reference sign B6).

In the CM 11B, when the Device#0 Port#0 reset request signal is received from the inter-FPGA communication control block 17 of the CM 11A, each of the inter-FPGA communication control blocks 17 inputs "1" into the OR circuit 18a and the OR circuit 18b (see reference sign B7).

When "1" is input from at least one of the inter-FPGA communication control blocks 17, the OR circuit 18a records "1" in the reset register 15. When "1" is input from at least one of the inter-FPGA communication control blocks 17, the OR circuit 18b sets "1" to an area of the cause register 16 corresponding to the Device#0 Port#0 reset request notification from the CM 11A in another system.

When "1" is recorded in the reset register 15 of the CM 11B, a Device#0 Port#0 reset signal ("1") is input into the Port#0 reset signal input terminal of the PCIe switch 21B as a reset instruction and the Port#0 (third port) of the PCIe switch 21B is put into the port reset state (see reference sign B8). Accordingly, communication by the channel 50b connected to the Port#0 is broken off (see reference sign B9).

Then, the channel 50 is cut off by the channels 50a, 50b being cut off and communication between the CM 11A and the CM 11B via the channel 50 is broken off. At this point, in the CM 11B, only the Port#0 of the PCIe switch 21B is reset and the whole PCIe switch 21B is not put into the reset state. Thus, the port (not shown) to which the device 19B is connected continues to operate normally and even if the Port#0 is cut off, the device 19B connected to the PCIe switch 21B can be used uninterruptedly.

That is, in the CM 11B, the CPU 12B is able to use the device 19B uninterruptedly (see reference sign B10).

Next, the method of identifying the suspicious CM 11 of a maintenance work object from among a plurality of the CMs 11 in the storage device 1 will be described.

As described above, there is a plurality of types of errors detected in the PCIe switch 21 of the other CM 11 (for example, the CM 11B) by putting the PCIe switch 21 of the one CM 11 (for example, the CM 11A) from the plurality of the CMs 11 into the port reset state.

For example, a UR (Unsupportable Request) error is an error message generated by the PCIe switch 21 due to an error arising inside the local CM 11. A linkdown error is an error message generated by the PCIe switch 21 due to an error arising in another system. These error messages (communication error detection notification) are generated based on specifications of PCIe.

As these error messages indicate, some suspicious locations, that is, some parts intended for maintenance work to correct an error are contained in the CM 11A and others are contained in the CM 11B.

Concerning suspicious locations determined to be contained in, for example, the other CM 11, the CM 11 on the side on which an error is detected is generally instructed to be degraded and the suspicious location and the degraded object match and therefore, no problem is posed.

However, if, for example, an error occurs in the CM 11A and a port reset of the PCIe switch 21A is performed as described above based on the error, as a result, a UR error or a linkdown error is generated in the inter-CM interface. When an error occurs in the CM 11A as described above, the suspicious location may erroneously be determined to be the local CM 11B based on an error message from the inter-CM interface.

If such an erroneous determination is made for the CM 11B, degradation processing of the CM 11B, which is not needed in the first place, is performed and, as a result, both of the CM 11A and the CM 11B are degraded and the storage device 1 is stopped.

Thus, in the storage device 1, the CPU 12 realizes a suspicious CM determination unit 120 by executing a suspicious CM determination program (firmware).

When an error message (communication error detection notification) generated by the inter-CM interface is received, the suspicious CM determination unit 120 identifies the suspicious CM 11 as a maintenance work object in response to the error message.

More specifically, an error is detected in the other CM 11, the PCIe switch 21 is put into the port reset state as described above, the inter-CM interface generates an error message after detecting the port reset, and the suspicious CM determination unit 120 receives the error message.

The suspicious CM determination unit 120 makes a determination of one of (1-1) to (3-2) cases in accordance with the received error message.

(1) When a UR Error is Notified by the Error Message

When a UR error is notified by the error message, that is, the local CM (second processing unit) 11 is indicated to be the degradation cause, the suspicious CM determination unit (cause information acquisition unit) 120 checks the other CM (first control device) 11 to see whether the cause of degradation of the CM 11 is the other CM 11.

Firmware of each of the CMs 11 reads content of the cause register 16 included in the FPGA 13 in the same CM 11 when an error occurrence is detected in the local CM 11. If identification information indicating one of the devices 21, 22 and the CPU 12 in the same CM 11 as an error cause is written in the cause register 16, firmware stores information (cause information) of "local CM degradation cause found" indicating that the cause of degradation of the local CM 11A is found in the local CM in a memory (not shown) or the like.

When a UR error is notified by the received error message, the suspicious CM determination unit (checking unit) 120 checks whether information of "local CM degradation cause found" for the other CM (first control device) 11 is stored.

When a request of checking is received, firmware (cause information notification unit) of the other CM 11 returns a response whether or not information of "local CM degradation cause found" is stored.

(1-1) If, as a result of checking, information of "local CM degradation cause found" is stored in the other CM 11, the error of the other CM 11 is determined to be the cause. That is, the error detected in the local CM 11 is determined to have been caused by an error that occurred in the other CM 11 and therefore, the suspicious CM determination unit 120 determines the other CM 11 as a maintenance work object.

(1-2) On the other hand, if, as a result of checking, information of "local CM degradation cause found" is not stored in the other CM 11, the error of the other CM 11 is determined not to be the cause. That is, the error of the local CM 11 is determined to the cause and thus, the suspicious CM determination unit 120 determines the local CM 11 as a maintenance work object.

(2) When a Linkdown Error is Notified by the Error Message

When a linkdown error is notified by the error message, that is, the other CM (first processing unit) 11 is indicated to be the degradation cause, the suspicious CM determination unit 120 checks whether information of "local CM degradation cause found" for the other CM (first control device) 11 is stored.

(2-1) If, as a result of checking, information of "local CM degradation cause found" is not stored in the other CM 11, the error of the other CM 11 is determined not to be the cause. For example, a case when there is a failure cause such as a disconnection in the channel 50 corresponds to this case.

In this case, the suspicious CM determination unit 120 determines the CM 11 (for example, the CM 11B) on the slave side of the two CMs 11 as a maintenance work object.

(2-2) On the other hand, if, as a result of checking, information of "local CM degradation cause found" is stored in the other CM 11, the error of the other CM 11 is determined to be the cause. That is, the error detected in the local CM 11 is determined to be caused by an error that occurred in the other CM 11 and thus, the suspicious CM determination unit 120 determines the other CM 11 as a maintenance work object.

(3) When a UR Error and a Linkdown Error are Notified by the Error Message

When a UR error and a linkdown error are notified by the error message, that is, the other CM 11 and the local CM 11 are indicated to be the degradation causes, it is impossible for the suspicious CM determination unit 120 to determine which CM is the cause and thus, the suspicious CM determination unit 120 checks whether information of "local CM degradation cause found" for the other CM 11 is stored.

(3-1) If, as a result of checking, information of "local CM degradation cause found" is not stored in the other CM 11, the error of the other CM 11 is determined not to be the cause. That is, the error of the local CM 11 is determined to be the cause and thus, the suspicious CM determination unit 120 determines the local CM 11 as a maintenance work object.

(3-2) On the other hand, if, as a result of checking, information of "local CM degradation cause found" is stored in the other CM 11, the error of the other CM 11 is determined to be the cause. That is, the error detected in the local CM 11 is determined to be caused by an error that occurred in the other CM 11 and thus, the suspicious CM determination unit 120 determines the other CM 11 as a maintenance work object.

A program (firmware) to realize the function of the aforementioned suspicious CM determination unit 120 is provided, for example, in a form recorded in a recording medium (not shown). Then, a computer reads the program from the recording medium and uses the program after the program being transferred and stored in an internal storage or an external storage. The program may also be provided to a computer from a storage such as a magnetic disk, an optical disk, or a magneto-optical disk via a communication path after the program being stored in the storage.

To realize the function of the suspicious CM determination unit 120, the program stored in an internal storage (memory (not shown) in the present embodiment) is executed by a microprocessor (CPU 12 in the present embodiment) of the computer. At this point, the program recorded in a recording medium may be read and executed by the computer.

The determination method of suspicious CM in the storage device 1 as an exemplary embodiment will be described with reference to the sequence diagram shown in FIG. 4.

Hereinafter, an example in which an error occurs in the CPU 12 of the CM11A will be shown. In FIG. 4, the same reference signs as aforementioned reference signs indicate the same processing.

When, for example, an error occurs in the CPU 12 of the CM 11A, the CPU 12A transmits a CPU error notification signal to the error detection logic 14 of the FPGA 13A provided in the same CM 11A. The error detection logic 14 detects the occurrence of an error by receiving the error notification signal (see reference sign B1).

When an error is detected, the error detection logic 14 sets "1" to the reset register 15 and also sets "1" to an area of the cause register 16 corresponding to the CPU 12A as a transmission source of error notification (see reference sign B2).

Firmware reads content of the cause register 16 (see reference sign C1). When identification information indicating one of the devices 21, 22 and the CPU 12 is recorded in the cause register 16 as an error cause, the firmware stores information of "local CM degradation cause found" indicating that the cause of degradation of the local CM 11A is found in the CM 11A (local CM 11A) in a memory (not shown) or the like.

In the present example, error cause information indicating that the error cause is the CPU 12 is stored in the cause register 16 and thus, the firmware stores information of "local CM degradation cause found" in a memory (not shown) or the like.

When "1" is recorded in the reset register 15 of the CM 11A, a Device#0 Port#0 reset signal ("1") is input into the Port#0 reset signal input terminal of the PCIe switch 21A as a reset instruction and the Port#0 of the PCIe switch 21A is put into the port reset state (see reference sign B3). Accordingly, communication by the channel 50a connected to the Port#0 is broken off (see reference sign B4).

With the communication by the channel 50a being broken off by the port reset, an error is detected by the inter-CM interface (PCIe switch 21B) and an error message of a linkdown error or a UR error is generated (see reference sign C2). The error message is generated based on, for example, the standard of PCIe and thus, the description of the generation method and notification method is omitted.

The firmware (suspicious CM determination unit 120) of the CM 11B is notified of the generated error message and the suspicious CM determination unit (receiving unit) 120 thereby detects the occurrence of an error (see reference sign C3).

The suspicious CM determination unit 120 checks the error message (see reference sign C4) and also checks the other CM 11A to see whether the error cause is found in the CM 11A. More specifically, the suspicious CM determination unit (checking unit) 120 checks the firmware of the CM 11A to see whether the CM 11A is alive and checks whether information indicating "local CM degradation cause found" is recorded by the firmware (see reference sign C5).

In the present example, as described above, "1" is set to the reset register 15 (see reference sign C6) and a flag indicating that the CPU 12 is the error cause is set to the cause register 16 (see reference sign C7). Also, as indicated by the aforementioned reference sign C1, the firmware of the CM 11A reads out content of the cause register 16 and stores "local CM degradation cause found" in a memory (not shown) or the like (see reference sign C8). The firmware (cause information notification unit) of the CM 11A returns a response that "local CM degradation cause found" is recorded in response to an inquiry from the suspicious CM determination unit 120 of the CM 11B (see reference sign C9).

In the CM 11B, the suspicious CM determination unit (cause information acquisition unit, determination unit) 120 receives the response and identifies the CM 11 intended as a maintenance work object according to the method of the aforementioned cases (1-1) to (3-2). In the example shown in FIG. 4, "local CM degradation cause found" is recorded in the CM 11A and thus, the suspicious CM determination unit 120 of the CM 11B determines the CM 11A as a maintenance work object and discards (inhibits) degradation processing of the CM 11B (see reference sign C10).

Thus, according to the storage device 1 as an exemplary embodiment, when an error occurs in one of a plurality of the CMs 11, a Device#0 Port#0 reset signal is input into the PCIe switch 21 in the CM 11 (for example, the CM 11A) in which the error is detected to put the Port#0 into the port reset state. In addition, a Device#0 Port#0 reset request signal is transmitted from the inter-FPGA communication control block 17 to the other CM 11 (for example, the CM 11B) via the channel 52. Also in the CM 11B having received the Device#0 Port#0 reset request signal, a Device#0 Port#0 reset signal is input into the PCIe switch 21 to put the Port#0 into the port reset state. Accordingly, the channel 50 is cut off between the CM 11A and the CM 11B and an error that arises in the CM 11A can be prevented from propagating to the CM 11B via the channel 50.

In the CM 11A and the CM 11B, inter-CM communication can be broken off without inhibiting communication between the device 19 and the CPU 12 connected to the PCIe switch 21 by inputting a Device#0 Port#0 reset signal into the PCIe switch 21 and thereby the Port#0 into the port reset state.

That is, for example, the SSD 19 connected to the PCIe switch 21 in the CM 12B can be used uninterruptedly while inter-CM communication is broken off.

A plurality of the inter-FPGA communication control blocks 17 provided in each of the CMs 11 is used to transmit a Device#0 Port#0 reset request signal in parallel between the CM 11A and the CM 11B over a plurality of the channels 52. Accordingly, the Device#0 Port#0 reset request signal is reliably transmitted and received between the CM 11A and the CM 11B, and the PCIe switch 21 can reliably be put into the port reset state in the CM 11 on the receiving side. That is, the communication between the CMs can reliably be broken off.

Further, in the CM 11 (for example, the CM 11B) having received an error message concerning an error detected by the inter-CM interface, the suspicious CM determination unit 120 checks whether information of "local CM degradation cause found" is stored in the other CM 11 (for example, the CM 11A).

When information of "local CM degradation cause found" is stored in the other CM 11A, the cause of degradation of the CM 11A lies in the other CM 11A and thus, only the CM 11A is determined to be the CM 11 intended for maintenance without degrading the CM 11B and the degradation of the CM 11B is inhibited. Accordingly, the storage device 1 can be caused to function uninterruptedly without performing unnecessary degradation processing of the CM 11B.

Regardless of the aforementioned embodiment, various modifications can be made and carried out without deviating from the spirit of the present embodiment.

In the aforementioned embodiment, for example, as shown in FIG. 1, each of the CMs includes the three inter-FPGA communication control blocks 17, but the number of the inter-FPGA communication control blocks 17 is not limited to three and the two or less, or the four or more inter-FPGA communication control blocks 17 may be included.

In the aforementioned embodiment, the two CMs 11A, 11B are included, but the number of the CMs is not limited to two and the three or more CMs may be included.

Further, in the aforementioned embodiment, the devices 21, 22 and the CPU 12 notifies the error detection logic 14 of an error in the CM 11, but the configuration is not limited to such an example and other elements may also notify the error detection logic 14 of an error.

Also, in the aforementioned embodiment, an example in which an error occurs in the CPU 12A of the CM 11A is shown, but the occurrence of an error is not limited to such an example and an error arising in the other devices 21, 22 can also be processed in the same manner.

Further, in the aforementioned embodiment, an error detected in the storage device 1 including the CM 11A, 11B is described, but the error is not limited to such an error.

That is, by applying the present embodiment to various systems having a redundant configuration with a plurality of modules or systems configured by connecting a plurality of modules, propagation of an error from the module in which the error occurs can be inhibited and also the module intended for maintenance work can be identified.

In addition, the present embodiment can be carried out and manufactured by persons skilled in the art thanks to the above disclosure.

According to an embodiment, propagation of an error that occurs in a control device can be inhibited All examples and conditional language recited herein are intended for the pedagogical purposes of aiding the reader in understanding the invention and the concepts contributed by the inventor to further the art, and are not to be construed limitations to such specifically recited examples and conditions, nor does the organizations of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. An information processing apparatus including a plurality of control devices made to be redundant, the information processing apparatus comprising:
   a receiving unit that receives a communication error detection notification generated by a switch device of a second control device based on a port reset of a first port of a first control device, the switch device including a second port of the second control device connected to the first control device via a first channel and a first port of the second control device connected to the first control device via a second channel and being connected to a processing device;
   an identification unit that confirms, when the receiving unit receives the communication error detection notification, identifying an error occurrence cause by contacting the first control device via a third channel that connects the first control device to the second control device and that is different from the first channel and the second channel; and
   a determination unit that determines a maintenance work object based on a result of the identifying.

2. The information processing apparatus according to claim 1, wherein the first control device transmits a reset instruction via the third channel.

3. The information processing apparatus according to claim 1, wherein the second control device includes a second reset processing unit that performs the port reset of the first port of the second control device included in the switch device of the second control device and connected to a second port of the first control device via the second channel when a notification of the reset instruction is received.

4. The information processing apparatus according to claim 1, wherein
   the first control device includes a cause information notification unit that makes a notification of cause information indicating an occurrence cause of an error detected in the first control device, and
   the determination unit identifies the error occurrence cause based on the cause information notified from the cause information notification unit.

5. The information processing apparatus according to claim 4, wherein when the cause information notified from the cause information notification unit indicates that the first control device is a cause after the receiving unit receives the communication error detection notification indicating that the second control device is a degradation cause, the determination unit determines the first control device as the maintenance work object.

6. The information processing apparatus according to claim 4, wherein when the cause information notified from the cause information notification unit does not indicate that the first control device is a cause after the receiving unit receives the communication error detection notification indicating that the first control device is a degradation cause, the determination unit determines slave control devices of the plurality of control devices as the maintenance work objects.

7. The information processing apparatus according to claim 4, wherein when the receiving unit receives the communication error detection notification indicating that the first control device is a degradation cause and the communication error detection notification indicating that the second control device is the degradation cause,
   the determination unit determines the first control device as the maintenance work object when the cause information notified from the cause information notification unit indicates that the first control device is a cause and
   the determination unit determines the second control device as the maintenance work object when the cause information notified from the cause information notification unit does not indicate that the first control device is the cause.

8. The information processing apparatus according to claim 1, wherein the first control device comprises:
   a first switch device including the first port connected to the second control device via the first channel and a second port connected to the second control device via the second channel, and to which the processing device is connected;
   a detection unit that detects an error in the first control device;
   a first reset processing unit that performs the port reset of the first port included in the first switch device; and
   a transmitting unit that transmits, via a channel that connects the first control device to the second control device, a reset instruction to the second control device.

9. A control device included by being made redundant with other control devices, comprising:

a receiving unit that receives a communication error detection notification generated by a switch device of the control device based on a port reset of a first port in the other control device, the switch device including a second port of the control device connected to the other control devices via a first channel and a first port of the control device connected to the other control devices via a second channel and to which a processing device is connected;

an identification unit that confirms, when the receiving unit receives the communication error detection notification, identifying an error occurrence cause by contacting the other control device via a third channel that connects the other control device to the control device and that is different from the first channel and the second channel; and a determination unit that determines a maintenance work object based on a result of the identifying.

10. The control device according to claim 9, further comprising a second reset processing unit that performs the port reset of the first port of the control device included in the switch device and connected to a second port of the other control device via the second channel when a notification of the reset instruction is received.

11. A non-transitory computer-readable recording medium recording a control program that instructs a computer included in a second control device included by being made redundant with a first control devices, wherein the control program causes a computer included in the second device to perform processing including:

receiving a communication error detection notification generated in a switch device of a second control device based on a port reset of a first port in a first control device, the switch device including a second port of the second device connected to the first control device via a first channel and a first port of the second device connected to the first control device via a second channel and being connected to a processing device;

when the communication error detection notification is received, identifying an error occurrence cause by contacting the first control devices via a third channel that connects the first control device to the second control device and that is different from the first channel and the second channel; and determining a maintenance work object based on an identification result.

12. The non-transitory computer readable recording medium recording a control program according to claim 11, wherein the computer is caused to perform processing including:

making a notification of cause information indicating an occurrence cause of an error detected in the first control device by the first control device; and identifying the error occurrence cause based on the cause information.

13. The non-transitory computer readable recording medium recording a control program according to claim 12, wherein the computer is caused to perform processing including:

when the cause information indicates that the first control device is a cause after the communication error detection notification indicating that the second control device is a degradation cause being received, determining the first control device as the maintenance work object.

14. The non-transitory computer readable recording medium recording a control program according to claim 12, wherein the computer is caused to perform processing including:

when the cause information does not indicate that the first control device is a cause after the communication error detection notification indicating that the first control device is a degradation cause being received, determining slave control devices of a plurality of control devices as the maintenance work objects.

15. The non-transitory computer readable recording medium recording a control program according to claim 12, wherein the computer is caused to perform processing including:

when the communication error detection notification indicating that the first control device is a degradation cause and the communication error detection notification indicating that the second control device is the degradation cause are received, determining the first control device as the maintenance work object when the cause information indicates that the first control device is a cause; and determining the second control device as the maintenance work object when the cause information does not indicate that the first control device is the cause.

16. The non-transitory computer readable recording medium recording a control program according to claim 11, wherein the computer is caused to perform processing including making the first control device send transmits a reset instruction via the third channel.

17. The non-transitory computer readable recording medium recording a control program according to claim 11, wherein the computer is caused to perform processing including performing the port reset of the first port of the second control device included in the switch device and connected to a second port of the first control device via the second channel when a notification of the reset instruction is received.

* * * * *